United States Patent [19]

Chiu

[11] Patent Number: 4,726,995
[45] Date of Patent: Feb. 23, 1988

[54] OXIDATION RETARDED GRAPHITE OR CARBON ELECTRODE AND METHOD FOR PRODUCING THE ELECTRODE

[75] Inventor: Charles C. Chiu, Middleburg Heights, Ohio

[73] Assignee: Union Carbide Corporation, Danbury, Conn.

[21] Appl. No.: 797,671

[22] Filed: Nov. 13, 1985

[51] Int. Cl.$^4$ .................. B32B 9/00; H05B 7/064; B05D 5/12; C09K 15/02
[52] U.S. Cl. ..................... 428/408; 428/540; 428/543; 428/688; 373/88; 427/113; 106/286.8; 106/287.27; 106/287.29
[58] Field of Search .............. 428/408, 540, 543, 688; 427/113; 373/88, 93; 106/286.3, 286.5, 286.6, 286.7, 286.8, 287.17, 287.27, 287.29

[56] References Cited

U.S. PATENT DOCUMENTS

| | | | |
|---|---|---|---|
| 2,685,539 | 8/1954 | Woodburn | 428/408 |
| 2,906,632 | 9/1959 | Nickerson | 501/99 |
| 3,342,627 | 9/1967 | Paxton | 427/113 X |
| 3,351,477 | 11/1967 | Wallouch | 501/14 |
| 4,439,491 | 3/1984 | Wilson | 428/408 |
| 4,530,853 | 7/1985 | Lewallen et al. | 428/408 X |
| 4,668,298 | 5/1987 | Funahashi et al. | 373/88 X |

*Primary Examiner*—John E. Kittle
*Assistant Examiner*—Susan S. Rucker
*Attorney, Agent, or Firm*—James L. Sonntag

[57] ABSTRACT

A method for treating a carbon or graphite electrode comprising contacting the electrode with a phosphate-containing compound and a halide-containing compound. The treated electrode is oxidation retarded and inhibits non-conductive film formation between the electrode and a copper electrode holder, thereby inhibiting arcing between the electrode and the electrode holder when used in an electric arc furnace.

16 Claims, No Drawings

OXIDATION RETARDED GRAPHITE OR CARBON ELECTRODE AND METHOD FOR PRODUCING THE ELECTRODE

FIELD OF THE INVENTION

The present invention relates generally to an oxidation retarded electrode and to a method for treating a graphite or carbon electrode with a mixture of a phosphate containing compound and a halide containing compound to retard oxidation of the electrode and to inhibit the formation of a non-conductive film between the electrode and a copper electrode holder.

BACKGROUND OF THE INVENTION

One of the most important applications of graphite is as electrodes for arc melting of steel. During the past 20 years the use of electric furnaces for melting steel has grown from a small volume specialty process to a high volume process with probably the lowest production costs of any of the recognized metallurgical processes. The process typically consumes from 10-12 pounds of graphite electrode for each ton of steel produced, or about 8% of the total production cost.

During operation of electric arc steel furnaces, the graphite electrodes are subject to mechanical, chemical and electrical stresses of such severity, that particularly for ultra high powered furnaces, only graphite of very high quality can be used. The electrodes are subject to the mechanical stresses from falling scrap being melted, from the inductance caused by the high AC current and also subject to oxidation due to the temperature reached, which will range up to the graphite sublimation temperature of over 3000° C.

Although pure graphite is one of the most inert and least reactive materials known, oxidation is a highly significant cause of deterioration of strength and loss of material at these extremely high temperatures encountered in an electric arc furnace. Thus, retardation of the oxidation reactions could be highly beneficial in reducing electrode consumption, both by reduction of direct oxidation and by lessening breakage caused by oxidation-induced loss of electrode strength.

During operation of an electric arc furnace, normally three electrodes are used, each of which is connected to one phase of the power supply through a metal clamp, and as the electrode is consumed, additional sections are added at the top and the column lowered to the operating level in the furnace. Although it is generally found that oxidation retardants are ineffective above about 1200° C., any improvement, even at lower temperatures, is welcome and can significantly reduce electrode consumption.

Oxidation retardant solutions have been used by graphite manufacturers to treat electrode sockets for many years. There have also been many attempts to use these solutions as oxidation retardants on the graphite electrodes themselves. However, these have been unsuccessful in the past due to a variety of shortcomings of such treatments including poor oxidation retardation on the electrodes, increased corrosion of the electrode holder, and arcing between the electrode and the electrode holder caused by the presence of a non-conductive film between the electrode and its holder. This non-conductive film which forms between the electrode and its holder or on the holder itself is caused by the prior-art oxidation retardant electrode treating solutions, especially phosphate-containing treating solutions, which cause a non-conductive film of copper phosphate to deposit upon copper electrode holders or at the electrode/electrode holder interface.

The build up of such a non-conductive film causes premature deterioration of the copper electrode holders. A solution to this problem of a non-conductive film build up would be desirable since it would increase the life of costly copper electrode holders, providing a valuable economic savings.

OBJECTS OF THE INVENTION

It is an object of the present invention to provide a method for treating a carbon or graphite electrode with a composition which retards oxidation of the electrode and inhibits the formation of a non conductive film between the treated electrode and a copper electrode holder, thereby minimizing or avoiding arcing between the electrode and electrode holder and increasing the useful life of the electrode holder.

It is another object of the present invention to provide an oxidation retarded electrode that inhibits non-conductive film formation between the electrode and a copper electrode holder.

These and other objects will become apparent from a reading of the following detailed specification.

SUMMARY OF THE INVENTION

In one aspect, the present invention relates to a method for retarding oxidation of a carbon or graphite electrode and of inhibiting non-conductive film formation between the electrode and a copper electrode holder comprising contacting the electrode with at least one liquid composition comprising at least one phosphate containing compound, at least one halide-containing compound and at least one solvent for the halide-containing compound and the phosphate-containing compound, wherein said halide-containing compound is present in an amount of between about 1 wt. % and about 5 wt. % based on the total weight of the composition.

In another aspect, the present invention relates to a carbon or graphite electrode having a phosphate-containing compound and halide-containing compound deposited on the surface and impregnated into at least a portion of the interior of said electrode, said halide-containing compound of being present on the electrode in an amount of between about 75 ppm and about 300 ppm and said phosphate-containing compound is present in an amount of between about 1 wt. % and about 7 wt. %, both based upon the weight of the treated portion of the electrode, said amount of halide-containing compound being impregnated into said electrode from at least one liquid composition containing between about 1 wt. % and about 5 wt. % of said halide compound based on the total weight of said composition.

DETAILED DESCRIPTION OF THE INVENTION

It has now been found that the presence of halide ion in an amount of between about 75 and about 300 ppm on the surface of a phosphate-treated electrode where the electrode contacts the copper holder will minimize or avoid the formation of a non-conductive film on the copper electrode holder or between the holder and the electrode and, thereby, prevent arcing and the corresponding destruction of the electrode holder. A practical way to accomplish this is to incorporate a halide into the phosphate oxidation retardant treating solution for the electrode. Alternatively, the phosphate and the halide can be incorporated into the electrode separately using separate treating solutions. This new finding that the phosphate treated electrode containing a halide ion will prevent the arcing problem is a significant factor in achieving fully functional electrodes for use in electric arc furnaces. In this regard, treated electrodes within the scope of the present invention are characterized by comparable flexural strength and reduced hygroscopicity as compared to phosphate-treated electrodes without halide treatment. Each of these characteristics contributes to the longevity of the treated electrode.

Halide-containing compounds useful in the practice of the present invention include, for example, magnesium chloride, sodium chloride, cupric iodide, cupric chloride, calcium bromide, hydrofluoric acid, hydrochloric acid, and mixtures thereof. The chloride salts are preferred since they are inexpensive and readily available.

The amount of halide-containing compound deposited on the surface of the electrode and impregnated into the electrode is preferably between about 75 ppm and about 300 ppm, more preferably between about 75 and about 200 ppm, based upon the weight of the treated portion of the electrode. The term "treated portion of the electrode" refers to that portion of the electrode which contains halide-phosphate treatment. For example, if only the outer quarter of a treated electrode contains halide and phosphate after contact with the halide and phosphate-containing solution or solutions, then calculations of the amount of halide incorporated into the electrode would be based on the outer quarter of the electrode.

The halide-containing compound is generally employed in an amount of between about 1 wt. % and about 5 wt. %, more preferably between 1.7 wt. % and about 3 wt. %, based on the total weight of the oxidation retardant composition. Above about 5 wt. %, excessive cost is incurred and oxidation protection is reduced because of the proportionately lower phosphate content; whereas below about 1 wt. %, the amount deposited on the electrode at a cure temperature of 500° C. to 600° C. is expected to be insufficient to inhibit formation of the non-conductive film between the carbon electrode and the electrode holder.

The other essential ingredient in the oxidation retardant composition is phosphate which provides oxidation retardation for the electrodes. Useful phosphate-containing compounds within the scope of the present invention include, for example, zinc phosphate, magnesium phosphate, iron phosphate, copper phosphate, aluminum phosphate, potassium phosphate, manganese phosphate and other soluble phosphate salts.. The preferred phosphate-containing compound is monoaluminum phosphate.

The amount of phosphate-containing compound deposited on the surface of, and impregnated into, the electrode is preferably between about 1 wt. % and about 7 wt. %, more preferably between about 2 and about 3 wt. %, based upon the total weight of the treated portion of the electrode. Below about 1 wt. %, the amount of phosphate compound is expected to be insufficient to provide oxidation retardation, whereas about 7 wt. %, the amount is expected to be too expensive from a cost standpoint.

The phosphate-containing compound is preferably employed in an amount of between about 10 wt. % and about 70 wt. %, more preferably between about 20 wt. % and about 70 wt. %, most preferably between about 20 wt. % and about 40 wt. % based upon the total weight of the oxidation retardant composition. When operating below the preferred lower limit of about 10 wt. % or above the preferred upper limit of about 70 wt. %, processing difficulties may be encountered in incorporating the preferred amount of phosphate-containing compound into the electrode. The balance of the oxidation retardant composition includes a solvent for the phosphate and the halide such as water or an organic solvent such as methanol. The preferred solvent is water.

A particularly preferred oxidation retardant composition is an aqueous solution of monoaluminum phosphate (commercially available from Stauffer Chemical Company), magnesium chloride hexahydrate, and water.

The carbon or graphite electrode may be treated with the oxidation retardant solution by a number of application procedures. The solution may be brushed or sprayed on the surface, the article may be dipped and soaked in the solution, or the solution may be applied by the process of impregnation, i.e., placing the article in a sealed chamber, evacuating the chamber, then bringing the impregnant into contact under pressure above atmospheric pressure, e.g., at 100 psi. Complete impregnation is preferred since it helps maintain the electrode's physical strength due to the presence of phosphate throughout the electrode.

An even more preferred method of treating the electrode with the oxidation retardant treating solution is to roll the electrode at ambient temperature and atmospheric pressure in a vessel containing the treating solution. This method allows a pre-established penetration of the treating solution into the electrode to be achieved. For a standard 24 inch commercial electrode, at least about 1 inch of penetration into the electrode by the treating solution is adequate to prevent the arcing problem referred to above even when the outermost portion of the electrode is consumed.

After treatment of the electrode with the phosphate-containing, halide-containing composition, the treated electrode is preferably heated to between about 500° C. and about 600° C. for 1 to 3 hours in order to "cure" the treated electrode. This cure insures that the phosphates on the treated electrode are in their water-insoluble, stable form in the pores of the electrode.

While the electrode treatment method of the present invention is particularly useful on graphite arc furnace electrodes, it will be useful in other applications involving a graphite/copper interface, such as Hall cell anodes.

The following examples are intended to illustrate, but not to limit, the present invention.

EXAMPLE 1

Electrical Conductivity Measurements

This Example shows the difference in electrical conductivity between a portion of a graphite electrode and a copper plate in contact with the electrode using an oxidation retardant solution in accordance with the present invention versus a solution of the prior art.

In this example, 23 grams (2.3 wt. %) of magnesium chloride hexahydrate, was added to 677 grams of aqueous monoaluminum phosphate. The mixture was mixed thoroughly using a magnetic stirrer. Three hundred grams of water was then added to the mixture while the solution was still being stirred. The resulting oxidation retardant solution contained 35 wt. % solids. Graphite electrode samples ranging from one inch diameter X one inch long to five inch diameter X twelve inch long in size were placed in an autoclave and the autoclave was evacuated (30 minutes) to remove the air and moisture from the electrode bodies through the graphite pores. The oxidation retardant solution was then pumped into the autoclave and totally immersed the samples. Nitrogen gas at a pressure of 100 psig was applied for 30 minutes to aid in impregnation by completely filling all pores of the samples with the solution. After the pressure cycle, the pressure was released and the samples were removed from the autoclave. The impregnated samples were then heat treated in the oven at 550° C. and 1 atmosphere for two hours to convert the oxidation retardant solution into insoluble phosphate, and to retain a very small amount of chloride ion (~100 ppm) in the sample. The cured samples were then machined.

As a comparative example, 300 g of water was added to 700 g of monoaluminum phosphate solution, resulting in a treat solution containing 35 wt. % solids. Electrode samples were treated with this solution and cured using the same procedures as those described above. Electrical conductivity measurements along the surface of a copper plate after it had been heated, in contact with the electrode sample, were made as hereinafter described. The copper plate was used to simulate a copper electrode holder.

In a resistance heated graphitizing furnace, conditions of the treated electrodes in contact with the copper holders in an electric arc furnace were simulated. A copper plate was placed against a slab of graphite treated with the chemical solution in the furnace column. The column was thermally cycled for two hours in the 350° C. to 550° C. range. After the test, the copper surface that was in contact with the graphite was measured for electrical conductivity. The copper plate surface, in contact with the graphite slab treated with the solution containing monoaluminum phosphate and magnesium chloride, in accordance with the present invention, had a conductive surface. The electrical resistance over a four-inch long path was zero indicating that arcing between a graphite electrode and the copper holder would not occur under use conditions in an electric arc furnace.

In contrast, the copper plate surface which was in contact with the graphite slab treated with monoaluminum phosphate alone in the comparative example provided an electrical resistance of 190 ohm, over a four-inch long path, indicating that arcing would occur between the graphite electrode and the copper holder under use conditions in an electric arc furnace.

EXAMPLE 2

Oxidation Retardant Measurements

This Example compares the oxidation retardant effectiveness of several phosphate and chloride-containing compositions of the present invention versus a comparison without chloride being present and, as a control, an untreated electrode.

The compositions of the present invention were prepared by adding to aqueous monoaluminum phosphate, a product of Stauffer Chemical Company, varying amounts of magnesium chloride hexahydrate, as identified in Table I below.

After impregnation with the various treating solutions identified in Table I by the procedure described in Example 1, 1 inch diameter X 1 inch long graphite samples were individually placed in a Thermo Gravimetric Analyzer furnace at 900° C. Dry air was circulated through the furnance at a rate of 5 cubic feet per hour. A measurement was made of the time required to provide a twenty percent weight loss in each sample. The results are presented in Table I.

TABLE I

| | Oxidation Test at 900° C. oven with 5 cubic feet per hour of air flow | | |
|---|---|---|---|
| Sample # | *Monoaluminum Phosphate | Magnesium Chloride Hexahydrate | Time in minutes to 20% sample weight loss |
| A (control) | None | None | 65 |
| B (comparison) | 100% | None | 110 |
| C | 98.3% | 1.7 wt. % | 105 |
| D | 96.7% | 3.3 wt. % | 115 |
| E | 94% | 6 wt. % | 115 |

*Aqueous monoaluminum phosphate, a product of Stauffer Chemical Company.

The results are presented in Table I above show that compositions sample numbers C through E within the scope of the present invention provided retardation of oxidation in terms of time in minutes to a 20% sample weight loss that was comparable to the oxidation retardation provided by Comparison B containing phosphate but no chloride in terms of minutes to a 20% weight loss in each electrode sample. It is noted that sample numbers D and E provided identical weight losses at 3.3 wt. % and 6 wt. % magnesium chloride hexahydrate levels respectively.

EXAMPLE 3

Flexural Strength and Hygroscopicity Tests

Treated electrode samples and comparative samples as prepared in Example I above were also subjected to flexural strength and hygroscopicity tests. Flexural strength tests on the electrodes using ASTM C 651-70 (Reapproved-1977) showed that the flexural strength of the treated sample was maintained after treatment with monoaluminum phosphate plus chloride in the oxidation retardant treat solution, as compared to the electrode strength with a phosphate only treatment; see the results given in Table II. Moreover, the treated graphite showed improvement in hygroscopicity with the chloride addition. The results for the hygroscopicity test are shown in Table III.

The hygroscopicity test was performed as follows: Into a 2 gallon laboratory vessel was placed each 1 inch diameter by 1 inch long pre-weighted graphite electrode sample on a tray in the vessel. Below the tray, the vessel was filled with water. The vessel was closed with a lid and the contents of the vessel were maintained at 25° C. and 100% relative humidity for three days. The sample was then removed from the vessel and weighed to determine the percent moisture weight-gain, as given in Table III.

The hygroscopicity test results given in Table III show a reduced moisture weight-gain for a chloride/phosphate treated electrode sample, as compared to a phosphate treated electrode (0.2 versus 0.6 wt. % moisture weight-gain, respectively). Such a reduced hygroscopicity is desirable since moisture weight-gain during storage can lead to a leaching out of the oxidation retardant treat.

TABLE II

ASTM-C651-70 (Reapproved 1977)
Flexural Strength Increase due to
Oxidation Retardant Treating

|  | Monoaluminum Phosphate Treat | Monoaluminum Phosphate + $MgCl_2.6H_2O$ Treat |
| --- | --- | --- |
| Flexural Strength Increase | 25% | 25% |

TABLE III

Hygroscopicity Test for
Treated Graphite Samples
at 100% Relative Humidity, at 25° C.

| Sample | Moisture Pick-up in Three Days, wt. % |
| --- | --- |
| Monoaluminum phosphate Treated | 0.6 |
| Monoaluminum phosphate + $MgCl_2.6H_2O$ Treated | 0.2 |

While this invention has been described with references to certain specific embodiments, it will be recognized by those skilled in this art that many variations are possible without departing from the scope and spirit of the invention and that it is intended to cover all changes and modifications of the invention disclosed herein for the purposes of illustration which do not constitute departure from the spirit and scope of the invention.

I claim:

1. A method for retarding oxidation of a carbon or graphite electrode and of inhibiting non-conductive film formation between the electrode and a copper electrode holder which comprises contacting the electrode with at least one liquid composition comprising at least one phosphate-containing compound, at least one halide-containig compound in an amount from about 1 wt. % to about 5 wt. % based on the total weight of the composition, and at least one solvent for the phosphate-containing compound.

2. The method of claim 1 wherein said halide-containing compound is a chloride salt or mixture of chloride salts.

3. The method of claim 1 wherein said halide-containing compound is present in an amount of between about 1.7 wt. % and about 3 wt. % based on the total weight of the composition.

4. The method of claim 1 wherein said phosphate containing compound is selected from the group consisting of zinc phosphate, magnesium phosphate, iron phosphate, aluminum phosphate, copper phosphate, potassium phosphate, and manganese phosphate.

5. The method of claim 1 wherein said phosphate-containing compound is present in said composition in an amount of between about 10 wt. % and about 70 wt. %, based on the total weight of the composition.

6. The method of claim 1 wherein said phosphate-containing compound is present in said composition in an amount of between about 20 wt. % and about 70 wt. %, based on the total weight of the composition.

7. The method of claim 1 wherein said phosphate-containing compound is present in said composition in an amount of between about 20 wt. % and about 40 wt. %, based on the total weight of the composition.

8. The method of claim 1 wherein said contact comprises complete impregnation of the electrode with said composition under pressure above atomospheric pressure.

9. The method of claim 1 wherein said contact comprises rolling the electrode in said composition to provide at least one inch of penetration into the electrode by the composition.

10. A carbon or graphite electrode having a phosphate-containing compound and halide-containing compound deposited on the surface and impregnated into at least a portion of the interior of said electrode, said halide-containing compound being present on the electrode in an amount of between about 75 ppm and about 300 ppm and said phosphate-containing compound is present in an amount of between about 1 wt. % and about 7 wt. %, both based upon the weight of the treated portion of the electrode, said amount of halide-containing compound being impregnated into said electrode from at least one liquid composition containing between about 1 wt. % and about 5 wt. % of said halide compound based on the total weight of said composition.

11. The electrode of claim 10 wherein said phosphate-containing compound and said halide-containing compound are impregnated into at least a one-inch depth of said electrode.

12. The electrode of claim 10 wherein said phosphate-containing compound and said halide-containing compound completely impregnate said electrode.

13. The electrode of claim 10 wherein said halide-containing compound is a chloride salt or mixture of chloride salts.

14. The electrode of claim 10 wherein said phosphate-containing compound is of zinc phosphate, magnesium phosphate, iron phosphate, aluminum phosphate, copper phosphate, potassium phosphate, and manganese phosphate.

15. The method of claim 1 wherein the solvent is an organic solvent.

16. The method of claim 1 wherein the solvent is water.

* * * * *